(12) United States Patent
Adams et al.

(10) Patent No.: US 8,910,658 B2
(45) Date of Patent: Dec. 16, 2014

(54) SWIVEL TOP SHAFT VALVE ACTUATOR

(71) Applicant: Vetco Gray Inc., Houston, TX (US)

(72) Inventors: Keith M. Adams, Katy, TX (US); Lloyd R. Cheatham, Lake Jackson, TX (US)

(73) Assignee: Vetco Gray Inc., Houston, TX (US)

( * ) Notice: Subject to any disclaimer, the term of this patent is extended or adjusted under 35 U.S.C. 154(b) by 164 days.

(21) Appl. No.: 13/717,073

(22) Filed: Dec. 17, 2012

(65) Prior Publication Data

US 2014/0166131 A1   Jun. 19, 2014

(51) Int. Cl.
  *F16K 37/00*   (2006.01)
  *F16K 31/122*   (2006.01)
  *F16K 31/126*   (2006.01)

(52) U.S. Cl.
  CPC .............. *F16K 37/00* (2013.01); *F16K 31/122* (2013.01); *F16K 31/126* (2013.01); *F16K 37/0008* (2013.01)
  USPC .......................... 137/556; 251/61.4; 251/63.6

(58) Field of Classification Search
  CPC ............ F16K 31/1262; F16K 37/0008; F16K 37/0058
  USPC ........ 137/556; 251/61, 61.2, 61.3, 61.4, 61.5, 251/63.5, 63.6
  See application file for complete search history.

(56) References Cited

U.S. PATENT DOCUMENTS

| | | | |
|---|---|---|---|
| 3,175,473 A * | 3/1965 | Boteler et al. .................. | 92/128 |
| 3,593,959 A * | 7/1971 | Greene ........................ | 251/63.6 |
| 3,958,592 A | 5/1976 | Wells et al. | |
| 4,135,546 A * | 1/1979 | Morrison ...................... | 251/63.6 |
| 4,274,432 A * | 6/1981 | Tunstall et al. ............. | 251/63.6 |
| 4,309,022 A * | 1/1982 | Reinicke et al. ............. | 251/61.4 |
| 4,491,060 A * | 1/1985 | Boski ............................. | 92/128 |
| 4,585,207 A * | 4/1986 | Shelton ........................ | 251/63.6 |
| 4,620,562 A * | 11/1986 | Pacht ...................... | 137/315.05 |
| 4,624,442 A * | 11/1986 | Duffy et al. ................. | 251/61.1 |
| 4,871,143 A * | 10/1989 | Baker .......................... | 251/63.6 |
| 4,934,403 A * | 6/1990 | Mooney et al. ............. | 251/63.5 |
| 5,464,040 A * | 11/1995 | Johnson ....................... | 137/556 |
| 5,964,446 A | 10/1999 | Walton | |
| 6,015,134 A | 1/2000 | Johnson | |
| 6,089,531 A | 7/2000 | Young | |
| 6,102,071 A | 8/2000 | Walton | |
| 6,250,605 B1 | 6/2001 | Young | |

(Continued)

FOREIGN PATENT DOCUMENTS

GB    1148817 A    4/1969

OTHER PUBLICATIONS

PCT Search Report and Written Opinion issued Apr. 3, 2014 in connection with corresponding PCT Patent Application No. PCT/US2013/074223.

*Primary Examiner* — John Rivell
(74) *Attorney, Agent, or Firm* — Bracewell & Giuliani LLP

(57) ABSTRACT

An actuator for operating a linear valve, such as a gate valve, includes a swivel coupling for detachably connecting an indicator stem to a plate within the actuator. In embodiments, the coupling includes a body with a lock ring groove. The detachable stem includes a downward facing recess having a groove on an inner diameter surface. The stem is placed on the body, and a lock ring engages both grooves to prevent axial movement of the stem relative to the body. The lock ring does not, however, prevent rotational movement of the stem relative to the body.

17 Claims, 3 Drawing Sheets

(56) References Cited

U.S. PATENT DOCUMENTS

| | | |
|---|---|---|
| 6,450,477 B1 | 9/2002 | Young |
| 6,854,704 B1 | 2/2005 | Young |
| 7,028,986 B2 | 4/2006 | Young |
| 7,677,526 B2 | 3/2010 | Lymberopoulos |
| 8,282,070 B2 | 10/2012 | Davies, Jr. |
| 2003/0034465 A1 | 2/2003 | Adams et al. |
| 2004/0007682 A1* | 1/2004 | Kajitani ............... 251/63.6 |
| 2006/0091339 A1 | 5/2006 | Young |
| 2012/0318388 A1* | 12/2012 | Du ............... 251/63.6 |

* cited by examiner

SWIVEL TOP SHAFT VALVE ACTUATOR

BACKGROUND OF THE INVENTION

1. Field of the Invention

The present invention relates in general to valves for mineral recovery wells, and in particular to actuators to actuate valves.

2. Brief Description of Related Art

A gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

An indicator stem protrudes through the cap of the housing of a typical valve actuator. The indicator stem is part of a sealing nut assembly that extends upward from the plate inside the valve actuator housing, or is threadingly connected to the top surface of the plate. The indicator stem sealing nut sealingly engages a bore of the plate. Leaks can occur between the indicator stem sealing nut and the plate. In pneumatic type actuators having a diaphragm, the sealing nut must be removed to replace the diaphragm.

In some cases, the actuator can be manually actuated by pressing against the indicator stem. The force on the stem, however, can damage the stem or internal components of the actuator. It is desirable to be able to externally actuate the valve without exerting forces on the stem that can damage the actuator. It is also desirable to be able to remove and replace the stem without breaking seals between the sealing nut arid the plate or diaphragm.

SUMMARY OF THE INVENTION

This application discloses embodiments of a valve actuator in which the indicator stem, or top shaft, of the actuator swivels or rotates without transmitting torque to the valve bonnet stem.

In an embodiment, a valve actuator has an indicator stem, or top shaft, for indicating the position of the valve and, in some cases, facilitating a manual override of the valve actuator. A swivel coupling is used to connect the indicator stem to a moveable plate within the actuator. The swivel coupling can be used with various types of actuators. For example, the coupling can function as a scaling nut assembly for sealingly engaging a diaphragm within the housing. In such embodiments, the sealing nut may be a pinch point/compression design for diaphragm actuators. Alternatively, the coupling can have elastomeric seals for piston actuator designs.

In an embodiment, the top shaft is attached to the sealing nut using a c-ring that is compressed and then released into an internal groove. This allows the top shaft to be able to rotate freely in any direction. Any length top shaft may be used to accommodate any valve stroke. A mechanical override may be installed on the actuator and, with a swivel coupling, no torque is transmitted to the valve bonnet stem. Furthermore, the top shaft does not have to be installed through the bottom of a diaphragm retainer plate or a piston.

The swivel coupling design allows the overall valve bonnet stem, or actuator stem, to be shorter and a larger centering or alignment boss from a part such as a down stop. The coupling also allows for the overall length of the top shaft to be shorter. Furthermore, the coupling allows for easy assembly and replacement of the top shaft, indeed, the top shaft may be replaced without breaking or disturbing established diaphragm or piston seals.

Embodiments of an apparatus for actuating a valve include a cylindrical housing having a valve end, a cap end, and a sidewall defining an inner diameter ("ID") of the housing. Embodiments thriller include a cap connected to the cap end of the housing, the cap having an orifice therethrough, an inlet through the cap or the cylindrical housing, a plate positioned within the housing, the plate moving between an extended position and a retracted position in response to pressure media from the inlet, the plate being nearer the valve end in the extended position than in the retracted position, a coupling connected to the plate, an indicator stem having a shaft, the indicator stem being detachably connected to the coupling and protruding through the orifice, a seal assembly connected to the cap, the seal assembly sealingly engaging the shaft, and a down stop in contact with the plate, the down stop being urged toward the valve end of the housing when the plate moves toward the extended position, and the down stop being operable to be connected to a valve stem for actuating a valve.

In embodiments, the coupling includes a body and the shaft is detachably connected to the body. In embodiments, the body is a cylindrical body and a base of the stem includes a cylindrical recess, the cylindrical recess concentrically engaging the cylindrical body. The cylindrical body can include an annular groove on an outer diameter surface, and the indicator stem can be detachably connected to the coupling via the annular groove. The cylindrical recess can include an annular groove on an inner diameter surface, and the apparatus can further include a lock ring partially positioned in each of the annular grooves.

In embodiments, the indicator stem can be detached from the coupling while the retainer is connected to the plate. The indicator stem can rotate about its axis relative to the coupling, and thus rotational force is not communicated between the indicator stem and the coupling. In embodiments, a diaphragm can cover the plate and extend to the cap end, wherein the coupling further includes a flange, the flange being operable to engage an inner diameter orifice of the diaphragm.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
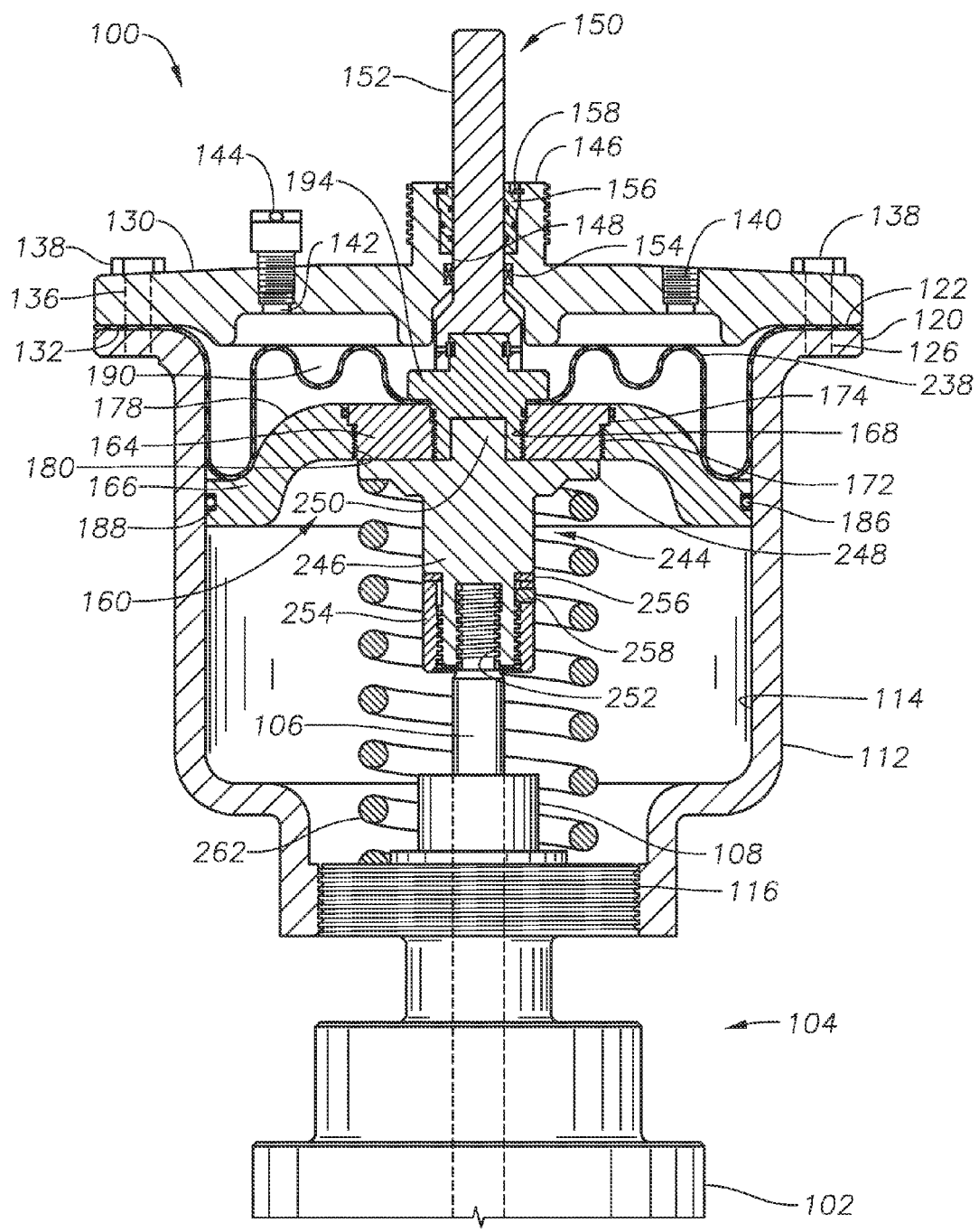
FIG. 1 is a side sectional environmental view of an embodiment of a diaphragm actuator with a swivel coupling.
Figure 2:
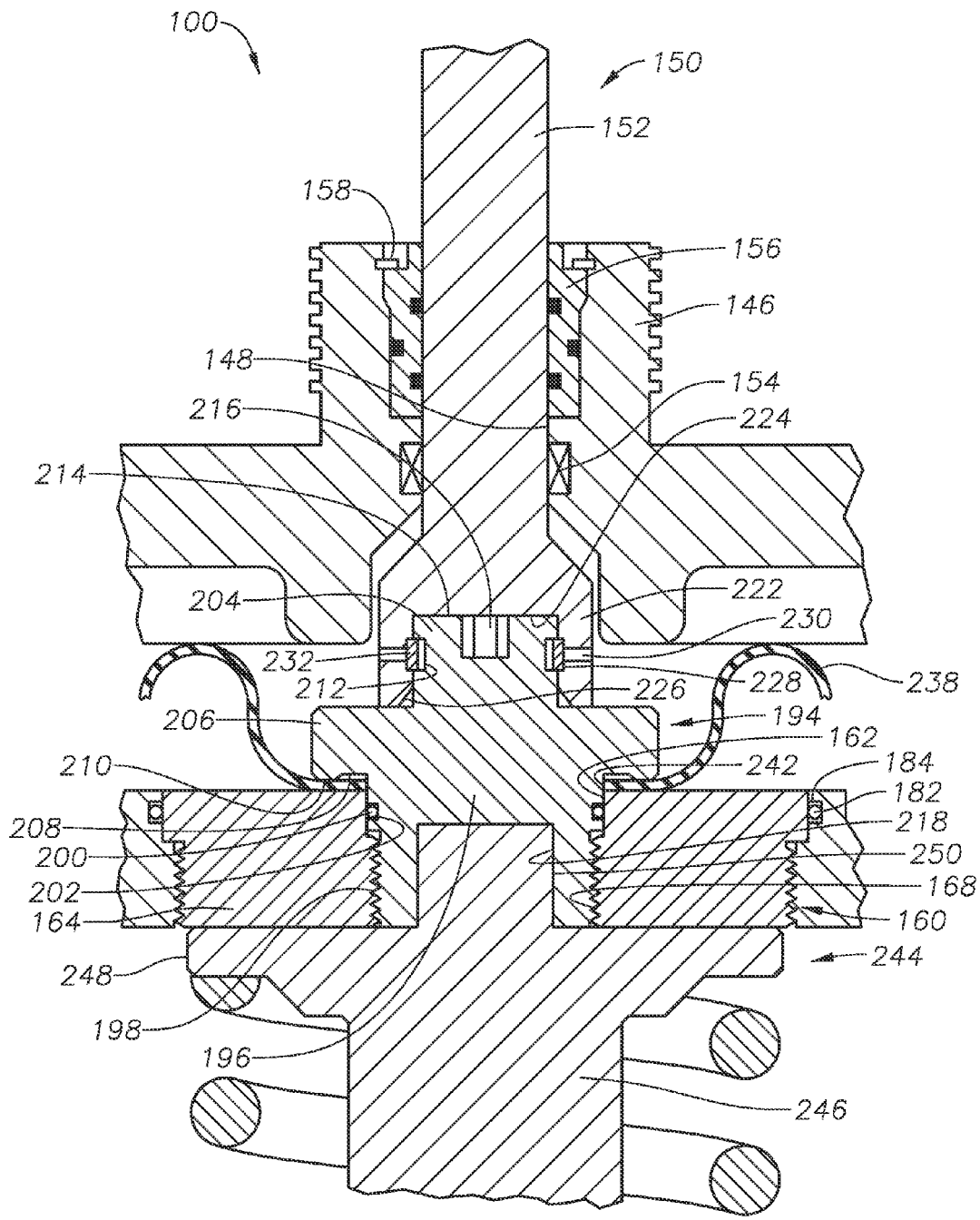
FIG. 2 is an enlarged side sectional environmental view of the coupling of FIG. 1.

Referring to FIGS. 1 and 2, actuator 100 is shown. Actuator 100 is used to open or close valve 102, to which actuator 100 is connected. As one of skill in the art will appreciate, valve 102 can be a gate valve or any other type of valve that is actuated by the extension of a linear member. Bonnet 104 is connected to the body of valve 102. Stem 106 passes through bonnet 104 and packing retainer 108. Actuator 100 is used to actuate valve 102 by urging stem 106 downward toward valve 102. Actuator 100, and other actuator embodiments herein, can include features described in U.S. patent application Ser. No. 13/679,553, filed on Nov. 16, 2012, the disclosure of which is incorporated herein by reference in its entirety.

Actuator housing 112 includes a cylindrical body having an inner diameter ("ID") surface 114. Housing 112 is manufactured from any of a variety of techniques including, for example, stamping, extrusion, and casting. In embodiments, housing 112 is free of welds or seams on interior surfaces such as ID surface 114. Housing 112 can be manufactured from NACE certified materials.

Actuator housing 112 is connected to bonnet 104 by way of connector 116. Connector 116 is shown as a threaded connection, but other types of connectors can be used. At the opposite end of housing 112, from connector 116, is flange 120, which flares outward from housing 112. Flange 120 has an upward facing surface 122, which is a smooth surface for forming a seal. A plurality of bolt holes 126 are spaced apart around flange 120.

Cap 130 is connected to housing 112. Cap 130 is an annular plate having an outer diameter approximately equal to the outer diameter of flange 120. Sealing surface 132 is a generally smooth, downward facing surface of cap 130 that aligns with upward facing surface 122 of flange 120. A plurality of bolt holes 136 are spaced apart around cap 130 to align with bolt holes 126. Cap bolts 138 are passed through bolt holes 136 to threadingly engage bolt holes 126 to secure cap 130 to housing 112. Other configurations can be used to secure cap 130 to housing 112, such as bolts that are inserted through bolt holes 126 to threadingly engage bolt holes 136, bolts that pass through both members and are secured with nuts (not shown), clamps (not shown), or collars (not shown).

Inlet 140 is an orifice through cap 130 and is spaced inwardly from sealing surface 132. Inlet 140 is connected to a pressurized media fluid source (not shown) that can selectively provide pressurized media fluid through inlet 140. Pressurized media is typically a fluid such as compressed air, nitrogen, well gas, or other types of gas or liquid. Orifice 142 is a second opening through cap 130. Relief device 144, shown in orifice 142, is a pressure relief device that will open to relieve pressure should the pressure exceed a predetermined value. As one of skill in the art will appreciate, relief device 144 can be one of a variety of devices to relieve an overpressure situation, such as a pressure relief valve, a rupture disk, or a controlled valve.

Indicator housing 146 is a housing that includes indicator orifice 148 for receiving indicator stem 150. Indicator stem 150 includes a cylindrical shaft 152 that protrudes through cap 130. Bearing 154 is a bearing surface on an ID of indicator orifice 148 for guiding stem 150. Sealing assembly 156 is a seal that dynamically seals around indicator stem shaft 152. As one of skill in the art will appreciate, sealing assembly 156 includes a snap ring 158, or other retainer (not shown), to hold sealing assembly 156 in position in indicator housing 146. Alternatively, sealing assembly 156 can be a sealing cartridge, a v-shaped lip seal with an o-ring, or other types of seals for dynamically sealing around a shaft.

Plate 160 is an annular plate positioned in housing 112. Plate 160 is generally perpendicular to the axis of housing 112. Plate 160 can span the inner diameter of housing 112 and slidingly or sealingly engage the inner diameter surface of housing 112. Plate 160 includes a central bore 162. Alternatively, plate 160 can span a portion of the inner diameter of housing 112 but not extend to the inner diameter surface of housing 112. The surface of plate 160 has a contour such that the radially outward portions are axially below the radially inward portions. As shown in FIG. 1, the outer diameter region of the plate is located axially nearer the valve end of the housing than the central portion of the plate. In embodiments, plate 160 has an upward facing convex surface and an upward facing concave surface, with the concave surface being spaced radially outward from the convex surface.

Plate 160 includes hub 164 and outer plate 166. Hub 164 includes central bore 162, having ID threads 168 on the ID surface. Hub 164 also includes a sealing surface on an ID of central bore 162. The outer diameter of hub 164 includes OD threads 172 and OD sealing surface 174.

Outer plate 166 is an annular ring that connects to hub 164, such that plate 160 includes outer plate 166 and hub 164. Upper surface 178 of outer plate 166 slopes downward and outward, with a generally convex shape, and then extends horizontally to ID surface 114. The ID bore of outer plate 166 includes ID threads 180 for threadingly engaging OD threads 172 of hub 164. Seal 182 is positioned in seal groove 184 on the bore of outer plate 166, and sealingly engages OD sealing surface 174 of hub 164. Sidewall seal 186 is positioned in groove 188 located on an outer diameter of outer plate 166, and thus is located on an outer diameter of plate 160. Sidewall seal 186 sealingly engages ID surface 114 of housing 112 to provide a dynamic seal between ID surface 114 and plate 160. In embodiments, a wear ring (not shown in FIG. 1) can be positioned in groove 188. As one of skill in the art will appreciate, a wear ring will reduce the friction between the outer diameter of plate 160 and ID surface 114 of housing 112. The wear ring (not shown in FIG. 1) does not have the same sealing properties as sidewall seal 186.

The space bounded by housing 112, plate 160, and cap 130 is defined as a pressure chamber 190. Fluid introduced through inlet 140 results in an increase in pressure, which causes plate 160 to move downward.

Coupling 194 is detachably connected to the center of plate 160. Coupling 194 includes a cylindrical body 196. Threads 198 are on an outer diameter of body 196, and threadingly engage ID threads 168 of hub 164. Coupling 194 includes a seal 200, positioned in a seal groove 202 on an OD surface of body 196 axially above threads 198, to sealingly engage central bore 162 of hub 164. Alternatively, there can be an absence of seals between body 196 and the inner diameter of plate 160.

Upper body 204 is the cylindrical portion of body 196 on the end opposite of threads 198. Shoulder 206 is a shoulder that extends radially from an outer diameter of body 196 of coupling 194. Shoulder 206 is located axially above seal groove 202. The outer diameter of shoulder 206 is greater than the inner diameter of bore 162 so that shoulder 206 radially overlaps a portion of the upward facing surface of plate 160. Shoulder 206 includes downward facing surface 208, which faces towards plate 160 when coupling 194 is installed in plate 160. Lip 210 protrudes axially downward from surface 208, near the edge of shoulder 206.

Lock ring groove 212 is an annular groove on an outer diameter surface of upper body 204, above downward facing shoulder 206. End face 214 defines the upper end of body 196. Tool receptacle 216 is a hex shaped recess for receiving an Allen wrench, and can he located on end face 214. Other techniques can be used for tightening coupling 194. Bore 218 is a downward facing cylindrical recess in the lower end of body 196.

Indicator stem 150 is detachably connectable to coupling 194. Indicator stem 150 includes shaft 152 connected to a base 222. Shaft 152 is a cylindrical shaft that extends upward through cap 130 and is sealingly engaged by sealing assembly 156. Base 222 is a cylindrical base having an outer diameter that is greater than the outer diameter of shaft 152. Base recess 224 is a cylindrical bore in a lower end of base 222, opposite from shaft 152. Chamfer 226 is an inward and downward facing tapered surface at the mouth of recess 224. The inner diameter of recess 224 is greater than or approximately equal to the outer diameter of upper body 204. Base 222, thus, can be concentrically positioned on upper body 204, such that upper body 204 engages recess 224.

Groove 228 is an annular groove extending around an inner diameter surface of recess 224. Orifice 230 is an orifice extending radially through the sidewall of base 222 and intersecting the bottom of groove 228. One or more orifices 230 are spaced apart around the circumference of base 222. Lock ring 232 is a resilient lock ring that is positioned to occupy at least a portion of each of lock ring groove 212 and groove 228. Lock ring 232 can be, for example, a c-ring. In its relaxed state, lock ring 232 has an inner diameter smaller than the outer diameter of upper body 204, and an outer diameter greater than the outer diameter of upper body 204. The width of lock ring 232, which is defined as the axial length of the annular ring, is less than or approximately equal to the width of each of the grooves 210 and 228.

In operation, lock ring 232 is snapped onto groove 212. Indicator stem 150 is then connected to coupling 194 by sliding base 222 onto upper body 204. Chamfer 226 compresses lock ring 232 inward, into groove 212, as recess 224 slides onto upper body 204. When groove 278 is axially aligned with groove 212, lock ring 232 is able to expand outward and engage each of groove 212 and groove 228. Lock ring 232, thus, prevents axial movement of indicator stem 150 relative to coupling 194. To remove indicator stem 150 from coupling 194, a tool or tools are inserted through orifices 230 and used to compress lock ring 232 into groove 212. When lock ring 232 is compressed to the point that the outer diameter of lock ring 232 is less than the inner diameter of recess 224, indicator stem 150 can slide off of upper body 204.

Diaphragm 238 is a flexible diaphragm extending at least from ID surface 114 to retainer 194. As shown in FIG. 1, diaphragm 238 is positioned between sealing surface 132 of cap 130 and surface 122 of flange 120. Bolt hole openings can be spaced apart around diaphragm 238, in alignment with cap bolts 138, so that cap bolts 138 pass through diaphragm 238 when it is positioned between cap 130 and flange 120. Cap bolts 138 are torqued to urge each sealing surface toward diaphragm 238. Diaphragm 238, thus, acts as a seal by sealingly engaging each of the sealing surfaces 132, 122.

An inner diameter orifice 242 is located at the center of diaphragm 238. The lower portion of retainer 194 passes through orifice 242 to engage threads 168 of central bore 162. The surfaces of diaphragm 238 are positioned between shoulder 206 of coupling 194 and plate 160. As shown in FIGS. 1 and 2, an upward facing surface of hub 164 sealingly engages a lower surface of diaphragm 238, and the downward facing surface 208 of shoulder 206 sealingly engages an upper surface of diaphragm 238. As coupling 194 is tightened toward plate 160, diaphragm 238 is compressed between the plate 160 and shoulder 206. Lip 210 is pressed into diaphragm 238 to further engage diaphragm 238 and resist radial movement of diaphragm 238 relative to plate 160. When diaphragm 238 is in position, pressure chamber 190 is defined by diaphragm 238 and cap 130.

Down stop 244 is a cylindrical member for transmitting axial force between plate 160 and stem 106. Down stop 244 includes cylindrical body 246 and shoulder 248 extending therefrom. The upward facing surface of shoulder 248 contacts the downward facing surface f plate 160. Nipple 250 extends axially from the upper end of down stop 244. When actuator 100 is assembled, nipple 250 is positioned in bore 218, thus concentrically aligning both members.

The lower end of down stop 244 includes threaded bore 252, which has threads on an ID surface, for threadingly engaging a threaded end of stem 106. As one of skill in the art will appreciate, the connection between down stop 244 and stem 106 can be any of various types of connections and is not limited to threaded connections. The outer diameter of the lower end of down stop 244 includes threaded collar 254 and can include any number of spacer rings 256. Threaded collar 254 contacts another member, such as packing retainer 108, located at the lower end of housing 112, to stop the further downward travel of down stop 244. Threaded collar 254 is adjusted so that it stops downward movement, and thus stem 106, at the appropriate position to completely open or completely close valve 102. Spacer rings 256 can be added or removed so that an opening of the gate (not shown) of gate valve 102 is properly aligned with a passage (not shown) of gate valve 102. Set screw 258 is used to hold threaded collar 254 in position.

Spring 262 surrounds down stop 244 and at least a portion of stem 106, and generally extends from the top of bonnet 104 to the downward facing surface of shoulder 248. Spring 262 is compressed as plate 160 moves from the upper position to the lower position. When fluid pressure from inlet 140 is reduced, spring 262 urges plate 160 up, away from valve 102. As one of skill in the art will appreciate, fluid force within valve 102 can act on stem 106 inside of valve 102 to urge stem 106 upward. Spring 262 and the upward force on the stem 106 can work together or independently to move plate 160 up.

In operation, diaphragm 238 is pressed between, and sealingly engages, surface 208 and plate 160, thus preventing pressurized media from leaking therebetween. In embodiments, shoulder 206 and diaphragm 238, or an annular seal between diaphragm 238 and plate 160 (not shown) form a seal and, thus, prevent pressurized media from contacting central bore 162 of plate 160. In such embodiments, no seal is required between coupling 194 and bore 162. As one of skill in the art will appreciate, if a seal is used between coupling 194 and bore 162, such a seal will be redundant to the seal between coupling 194 and diaphragm 238.

Pressurized media is introduced through inlet 140 into pressure chamber 190. The pressurized media exerts downward force on diaphragm 238 and plate 160, which urges plate 160, downstop 244, and stem 106 downward to actuate valve 102. As plate 160 moves downward, coupling 194, being connected to plate 160, also moves downward. Indicator stem 150, being connected to coupling 194, also moves downward. From the exterior of actuator 100, the extension and retraction of stem 150 provides a visual indication of the position of plate 160 and, thus, the state of valve 102.

Stem 150 is free to rotate about its axis in either direction, without causing coupling 194 to rotate and, thus, without imparting rotational force to plate 160. Bore 224 in base 222 of stem 150 is cylindrical, and is fitted to cylindrical upper body 204, and thus the two components can rotate relative to each other. Lock ring 232, being annular, restricts axial movement of stem 150 relative to coupling 194 but does not restrict rotational movement of stem 150 relative to coupling 194. As one of skill in the art will appreciate, operators sometimes need to manually override valve actuator 100. Manual override may be required, for example, if actuator 100 does not respond to pressurized media or if pressurized media is not available. The manual override can include pushing downward on stem 150 with a tool or another type of actuator. In the event that such manual override exerts torque on stem 150, stem 150 can rotate freely relative to coupling 194, even as it moves axially, and thus not transmit torque to coupling 194.

At some point, it may be desirable to replace stem 150 with another stem. For example, stem 150 could become damaged, or an operator may want to use a stem that is longer, shorter, or made of a different material. Stem 150 can be removed, and replaced, without breaking the seal between diaphragm 238 and plate 160. To accomplish such replacement, cap 130 is removed. Shaft 152 can slide through orifice 148 as cap 130 is removed. A tool is inserted through orifices 230 to depress lock ring 232 into lock ring groove 212, at which point stem 150 is removed from upper body 204. A new stem 150, which can be free of damage, have a different length shaft 152 or be made of a different material, can then be installed onto coupling 194. During the removal and reinstallation of stem 150, diaphragm 238 remains sealingly engaged between shoulder 206 and the surface of plate 160.

Figure 3:
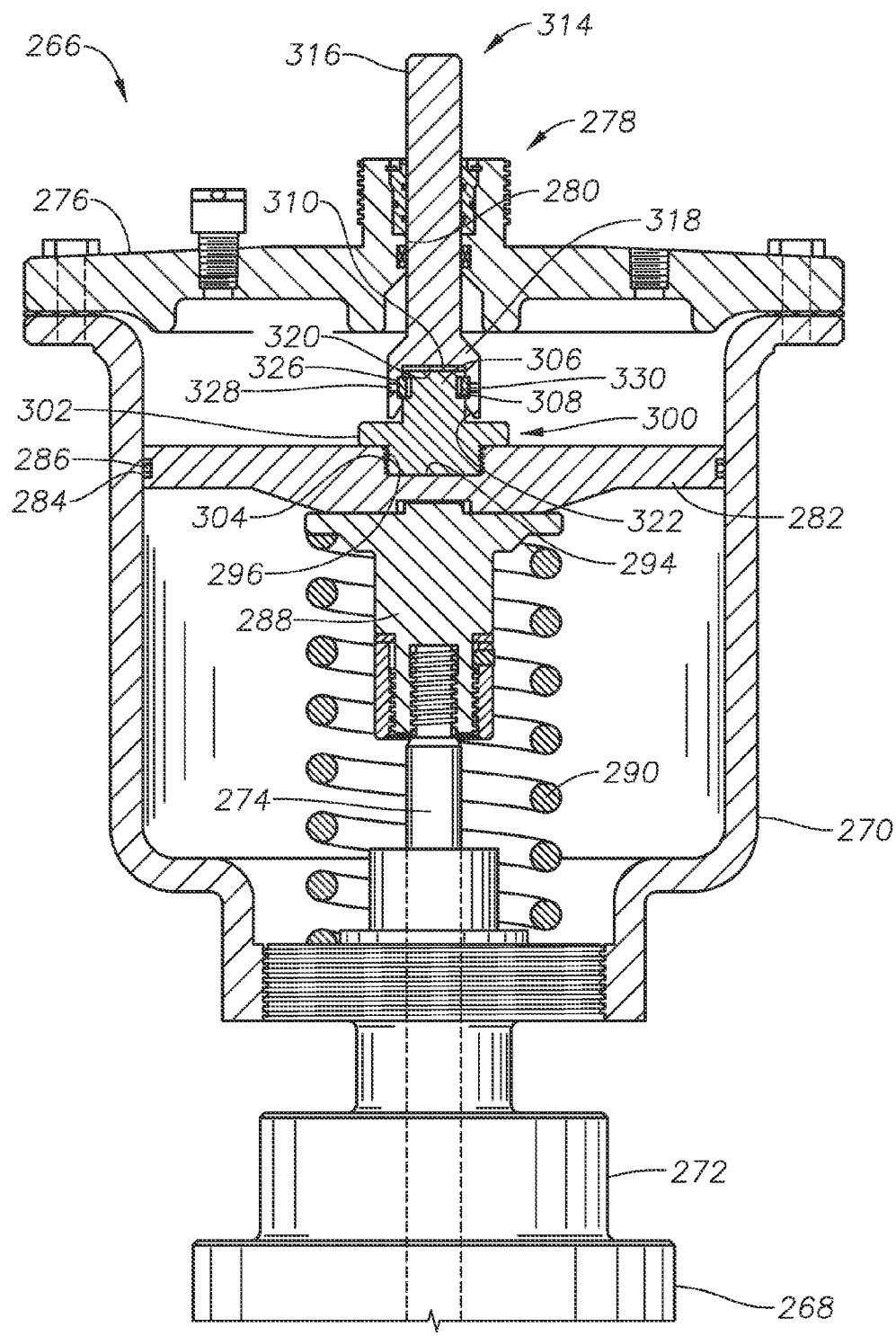
FIG. 3 is a side sectional environmental view of an embodiment of a piston actuator with a swivel coupling.

Referring now to FIG. 3, actuator 266 is a piston type actuator for actuating valve 268. Actuator 266 includes housing 270, which is detachably connected to bonnet 272. Actuator stem 274 extends downward through housing 270 and actuates valve 268. Cap 276 is connected to and sealingly engages housing 270. Sealing assembly 278 is a sealing mechanism for sealing around a shaft protruding through orifice 280 of cap 276. Piston plate 282 is positioned within housing 270. The outer diameter of plate 282 includes seal groove 284, in which seal 286 is located. Seal 286 forms a seal between an outer diameter of plate 282 and the inner diameter surface of housing 270. Downstop 288 is in contact with a lower surface of plate 282. Stem 274 is connected to downstop 288, so that downward movement of plate 282, via downstop 288, urges stem 274 downward. Spring 290 urges downstop 288, and thus stem 274 and plate 282, upward.

Plate 282 includes a recess 294 on an upward facing surface. Recess 294 is a cylindrical bore that does not extend through plate 282. Threads 296 are located on an inner diameter surface of recess 294.

Coupling 300 is detachably connected to the center of plate 282. Coupling 300 includes a cylindrical body 302. Threads 304 are on an outer diameter of body 302, and threadingly engage ID threads 296 of plate 282. Upper body 306 is the cylindrical portion of body 302 on the end opposite of threads 304. Lock ring groove 308 is an annular groove on an outer diameter surface of upper body 306. End face 310 defines the upper end of body 306.

Indicator stem 314 is detachably connectable to coupling 300. Indicator stem 314 includes shaft 316 connected to a base 318. Shaft 316 is a cylindrical shaft that extends upward through orifice 280 of cap 276 and is sealingly engaged by sealing assembly 278. Base 318 is a cylindrical base having an outer diameter that is greater than the outer diameter of shaft 316. Base recess 320 is a cylindrical bore in a lower end of base 318, opposite from shaft 316. Chamfer 322 is an inward and downward facing tapered surface at the mouth of recess 320. The inner diameter of recess 320 is greater ha or approximately equal to the outer diameter of upper body 306. Base 318, thus, can be concentrically positioned on upper body 306, such that upper body 306 engages recess 320.

Groove 326 is an annular groove on an inner diameter surface of recess 320. Orifice 328 is an orifice extending radially through the sidewall of base 318 and intersecting the bottom of groove 326. One or more orifices 328 are spaced apart around the circumference of base 318. Lock ring 330 is a resilient lock ring that is positioned to occupy at least a portion of each of groove lock ring groove 308 and groove 326. Lock ring 330 can be, for example, a c-ring. In its relaxed state, lock ring 330 has an inner diameter smaller than the outer diameter of upper body 306, and an outer diameter greater than the outer diameter of upper body 306. The width of lock ring 330, which is defined as the axial length of the annular ring, is less than or approximately equal to the width of each of the grooves 308 and 326.

In operation, lock ring 330 is snapped onto lock ring groove 308. Indicator stem 314 is then connected to coupling 300 by sliding base 318 onto upper body 306. Chamfer 322 compresses lock ring 330 inward, into groove 308, as recess 320 slides onto upper body 306. When groove 326 is axially aligned with groove 308, lock ring 330 is able to expand outward and engage each of groove 308 and groove 326. Lock ring 330, thus, prevents axial movement of indicator stem 314 relative to coupling 300. To remove indicator stem 314 from coupling 300, a tool or tools are inserted through orifices 328 and used to compress lock ring 330 into groove 308. When lock ring 330 is compressed to the point that the outer diameter of lock ring 330 is less than the inner diameter of recess 320, indicator stem 314 can slide off of upper body 306.

While the invention has been shown or described in only some of its forms, it should be apparent to those skilled in the art that it is not so limited, but is susceptible to various changes without departing from the scope of the invention.

What is claimed is:

1. An apparatus for actuating a valve, the apparatus comprising:
    a cylindrical housing having a valve end, a cap end, and a sidewall defining an inner diameter ("ID") of the housing;
    a cap connected to the cap end of the housing, the cap having an orifice therethrough;
    an inlet through one of the cap and the cylindrical housing;
    a plate positioned within the housing, the plate moving between an extended position and a retracted position in response to pressure media from the inlet, the plate being nearer the valve end in the extended position than in the retracted position;
    a coupling connected to the plate;
    an indicator stem having a shaft, the indicator stem being detachably connected to the coupling and protruding through the orifice, wherein the indicator stem can be detached from the coupling while the coupling is connected to the plate;
    a seal assembly connected to the cap, the seal assembly sealingly engaging the shaft; and
    a down stop in contact with the plate, the down stop being urged toward the valve end of the housing when the plate moves toward the extended position, and the down stop being operable to be connected to a valve stem for actuating a valve.

2. The apparatus according to claim 1, wherein the coupling comprises a body and the shaft is detachably connected to the body.

3. The apparatus according to claim 2, wherein the body is a cylindrical body and a base of the stem comprises a cylindrical recess, the cylindrical recess concentrically engaging the cylindrical body.

4. The apparatus according to claim 3, wherein the cylindrical body comprises an annular groove on an outer diameter surface and the indicator stem is detachably connected to the coupling via the annular groove.

5. The apparatus according to claim 4, wherein the cylindrical recess comprises an annular groove on an inner diameter surface, the apparatus further comprising a lock ring partially positioned in each of the annular grooves.

6. The apparatus according to claim 1, wherein the indicator stem rotates about its axis relative to the coupling.

7. The apparatus according to claim 1, wherein rotational force is not communicated between the indicator stem and the coupling.

8. The apparatus according to claim 1, further comprising a diaphragm covering the plate and extending to the cap end, wherein the coupling further comprises a flange, the flange being operable to engage an inner diameter orifice of the diaphragm.

9. An apparatus for actuating a valve, the apparatus comprising:
   a housing having a housing body and a cap;
   a connector positioned within the housing and operable to receive an actuator stem from a valve;
   a plate in contact with the connector, the plate moving between an extended position and a retracted position in response to pressure media, the refracted position being nearer the cap than the extended position;
   a coupling connected to the plate; and
   an indicator stem detachably connected to the coupling, the indicator stem having a shaft protruding through an orifice of the cap, wherein the indicator stem can be detached from the coupling while the coupling is connected to the plate.

10. The apparatus according to claim 9, wherein the coupling further comprises a coupling body and the indicator stem is detachably connected to the coupling body.

11. The apparatus according to claim 10, wherein the coupling body is a cylindrical body and a base of the indicator stem comprises a cylindrical recess, the cylindrical recess concentrically engaging the cylindrical body.

12. The apparatus according to claim 11, wherein the cylindrical body comprises an annular groove on an outer diameter surface and the indicator stem is detachably connected to the coupling via the annular groove.

13. The apparatus according to claim 12, wherein the cylindrical recess comprises an annular groove on an inner diameter surface, the apparatus further comprising a lock ring partially positioned in each of the annular grooves.

14. The apparatus according to claim 9, wherein rotational force is not communicated between the indicator stem and the coupling.

15. The apparatus according to claim 9, further comprising a diaphragm covering the plate and extending to the cap end, wherein the coupling further comprises a flange, the flange being operable to sealingly engage an inner diameter orifice of the diaphragm.

16. A valve assembly, the valve assembly comprising:
   a gate valve operable to selectively obstruct a bore;
   an actuator stem connected to the gate valve; and
   an actuator comprising:
      a housing having a body and a cap;
      a connector positioned within the housing and connected to the actuator stem;
      a plate in contact with the connector, the plate moving between an extended position and a retracted position in response to pressure media, the retracted position being nearer the cap than the extended position;
      a coupling connected to the plate; and
      an indicator stem detachably connected to the coupling, the indicator stem having a shaft protruding through an orifice of the cap, wherein the in indicator stem can be detached from the coupling while the coupling is connected to the plate.

17. The apparatus according to claim 16, wherein rotational force is not communicated between the indicator stem and the coupling.

* * * * *